(12) United States Patent
Verdier et al.

(10) Patent No.: US 8,202,347 B2
(45) Date of Patent: Jun. 19, 2012

(54) PROCESS FOR RECYCLING ALUMINUM ALLOY SCRAP COMING FROM THE AERONAUTICAL INDUSTRY

(75) Inventors: Jean-Francois Verdier, Issoire (FR); Jean-Remi Butruille, Montbonnot Saint Martin (FR); Michel Leroy, Saint-Egreve (FR); Didier Valax, Ax les Thermes (FR)

(73) Assignee: Constellium France, Paris (FR)

( * ) Notice: Subject to any disclaimer, the term of this patent is extended or adjusted under 35 U.S.C. 154(b) by 666 days.

(21) Appl. No.: 12/304,548

(22) PCT Filed: Jun. 18, 2007

(86) PCT No.: PCT/FR2007/001005
§ 371 (c)(1),
(2), (4) Date: Dec. 12, 2008

(87) PCT Pub. No.: WO2007/147962
PCT Pub. Date: Dec. 27, 2007

(65) Prior Publication Data
US 2009/0285716 A1   Nov. 19, 2009

(30) Foreign Application Priority Data
Jun. 23, 2006   (FR) .................................... 06 05642

(51) Int. Cl.
C22B 21/06 (2006.01)
C22B 9/16 (2006.01)
C22B 7/00 (2006.01)

(52) U.S. Cl. .............. 75/679; 75/10.11; 75/588; 75/687
(58) Field of Classification Search ................ 75/10.11, 75/10.62, 588, 679, 687
See application file for complete search history.

(56) References Cited

U.S. PATENT DOCUMENTS
4,200,262 A * 4/1980 Evans et al. ..................... 266/44
(Continued)

FOREIGN PATENT DOCUMENTS

| JP | 07207378 | 8/1995 |
|---|---|---|
| JP | 09078152 | 3/1997 |
| WO | 9503434 | 2/1995 |
| WO | 0040768 | 7/2000 |
| WO | 03020991 | 3/2003 |

OTHER PUBLICATIONS

A.I. Kahveci and A. Unal. Refining of a 5xxx Series Aluminum Alloy Scrap by Alcoa Fractional Crystallization Process, in Recycling of Metals and Engineered Materials, Edited by D.L. Stewart et al, TMS, 2000, pp. 979-991.*

(Continued)

Primary Examiner — George Wyszomierski
Assistant Examiner — Mark L Shevin
(74) Attorney, Agent, or Firm — Dennison, Schultz & MacDonald

(57) ABSTRACT

A manufacturing process for a remelt block containing aluminum designed for making aluminum alloy for the aircraft industry in which scrap containing mainly aluminum alloys used in the aircraft industry is supplied during a supply stage, the scrap is melted in a smelting furnace in order to obtain an initial molten metal bath during a smelting stage, the initial molten metal bath is subjected to purification by fractional crystallization in order to obtain a solidified mass and a bath of residual liquid during a segregation stage, and the solidified mass is recovered in order to obtain a remelt block during a recovery stage. The invention is particularly useful for the recycling of aluminum alloys used in the aircraft industry as it makes it possible to purify scrap of series 2XXX or series 7XXX alloys for iron and silicon, without eliminating additive elements such as zinc, copper and magnesium.

22 Claims, 3 Drawing Sheets

U.S. PATENT DOCUMENTS

| | | |
|---|---|---|
| 4,221,590 A | 9/1980 | Dawless et al. |
| 4,456,480 A | 6/1984 | Wintenberger |
| 4,734,127 A | 3/1988 | Iuchi et al. |
| 5,573,574 A | 11/1996 | Leroy |
| 6,293,990 B1 * | 9/2001 | Verdier et al. ................. 75/353 |
| 6,406,515 B1 * | 6/2002 | Leroy ............................ 75/679 |
| 2002/0038581 A1 | 4/2002 | Leroy |
| 2004/0261572 A1 | 12/2004 | De Vries |

OTHER PUBLICATIONS

S. Bell et al. Final Report on Scrap Management, Sorting and Classification of Aluminum, Report No. 2003-22(CF), Dec. 2003, Enhanced Recycling, Action Plan 2000 on Climate Change, Minerals and Metals Program, 21 pages.*

* cited by examiner

PROCESS FOR RECYCLING ALUMINUM ALLOY SCRAP COMING FROM THE AERONAUTICAL INDUSTRY

FIELD OF THE INVENTION

The invention relates to the manufacture of aluminum alloy remelt ingots from scrap (raw materials for recycling, such as chips or machining off-cuts). The invention particularly relates to the recycling of scrap resulting from the manufacturing processes of the aircraft and space industries.

BACKGROUND OF RELATED ART

In several industries, the manufacturing processes for metal products finished by processes such as machining, transformation and cutting of intermediate products generate significant amounts of chips and machining off-cuts. In this text, this waste is indicated by the term "scrap" which is used in standard EN 12258-3 to indicate the products for aluminum recycling. The aircraft and space industries in particular generate a significant amount of scrap because many structural parts and components of an aircraft are obtained by integral machining of massive parts. However scrap is often difficult to recycle directly because it is mixed with other aluminum alloys or other materials used in aeronautics such as stainless steels and titanium (Wilson et al. Journal de Physique C-75 1987). Waste from machining aeronautical alloys, for example, is recycled in aluminum-silicon alloys designed for molded products, in particular for the automobile industry. This recycling method is the usual one for scrap recycling. It leads to a partial loss in value of the metal.

It is also possible to manufacture aluminum alloy products designed for aeronautical and space applications from scrap from the aircraft industry in an integrated recycling process. Successive recycling of series 2XXX or series 7XXX alloys in this integrated process generally leads, however, to an increase in the content of certain impurities such as iron and silicon. During machining, handling and storage phrases, it frequently happens that dust gets incorporated into the scrap and this dust is generally rich in iron and silicon which are two very common elements in any industrial environment. In the same way, during the process of scrap smelting, contact with tools and furnace walls frequently produces an increase in the iron and silicon content.

In addition, new grades of series 2XXX or series 7XXX alloys for which the iron and silicon content can be kept below 0.07% by weight, or even, in certain cases, below 0.05% by weight, prove difficult or even impossible to manufacture from scrap using current recycling processes.

The application of purification operations in a molten metal bath obtained by scrap smelting has been considered. Patent applications JP07166259, JP07207378, JP09178149 and JP09263853 (Furukawa Electric) seek to solve the problem of recycling plated sheets designed for the manufacture of heat exchangers by brazing. The scrap from these products contains several percent of silicon by weight, which makes recycling difficult. Processes including a fractional, crystallization stage and a final stage involving pressing the crystals formed to eject the residual liquid are described in these patent applications. These processes aim to eliminate the silicon. The special problems posed by the purification of iron are not dealt with in these requests. Other segregation processes including a cooling stage using a molten salt have also been considered, in particular for the production of pure metal of type P0101, the only impurities in which are iron and silicon with a content lower than 0.1% by weight (see EP 1.520.052, EP 1.520.053 and WO 2005/049875, Corus Technology). The use of a molten salt significantly complicates this type of recycling operation.

Request PCT WO 2005/095658 (Corus Technology) describes the principle of a process in which the molten metal to be purified is cooled in order to simultaneously form purified crystals and crystals containing a foreign element (such as an element forming intermetallic compounds) and in which these two types of crystals are separated by a solid-solid separation technique. The solid-solid separation technology is not described in this patent application.

The use of an additive to force the formation of precipitates and thereby facilitate their separation has also been considered. Adding Mn is encouraged in U.S. Pat. No. 5,741,348 (Hoogovens) and EP 1 288 319 (Corus Technology) and in patent application JP0835021 (Agency of Ind science & technol) to form intermetallic precipitates containing iron in order to eliminate it. These processes are not applicable in complex systems such as aeronautical alloys because of the number of intermetallics to be taken into consideration.

Furthermore, adding boron to eliminate particular elements such as peritectic elements has been considered. Patent EP 1 101 830 (Pechiney Rhenalu) describes a manufacturing process for an intermediate product in a given alloy of series 7XXX from recycling products. In order to be able to recycle off-cuts from different alloys of the 7XXX series without having to carry out sorting, this patent describes a process including at least one refining stage of said recycling products making it possible to reduce the content of a peritectic element such as Cr or Zr with the help, for example, of a selective precipitating agent including boron.

The recycling of scrap from the aircraft industry poses several special problems which have not been solved in the prior art, in particular:
- industrially decreasing the content of elements which would not allow recycling in equivalent grades such as Fe and Si, in particular to obtain Fe and Si contents lower than 0.1% by weight and preferably lower than 0.05% by weight,
- not decreasing the content of elements common to the majority of these alloys (Zn, Mg, Cu in series 7XXX; Cu and Mg in series 2XXX),
- in certain cases, not decreasing the content of certain expensive elements (Li, Ag, Sc) that may be used in certain alloys.

It would therefore be useful to invent a recycling process including a stage for iron and silicon purifying of aluminum alloy scrap of series 2XXX or series 7XXX, without eliminating the additive elements such as zinc, copper and magnesium, for example.

The applicant therefore sought a manufacturing process for intermediate products using scrap from the aircraft industry which would facilitate recycling of series 7XXX and series 2XXX alloys.

SUBJECT OF THE INVENTION

A first subject of the invention is a manufacturing process for a remelt block containing aluminum designed for making aluminum alloy for the aircraft industry in which
(i) scrap containing mainly aluminum alloys used in the aircraft industry is supplied during a supply stage;
(ii) said scrap is melted in a smelting furnace in order to obtain an initial molten metal bath during a smelting stage;
(iii) the initial molten metal bath is subjected to purification by fractional crystallization in order to obtain a solidified mass and a bath of residual liquid during a segregation stage;
(iv) the solidified mass is recovered in order to obtain a remelt block during a recovery stage.

A second subject of the invention is a remelt block obtained by the process according to the invention characterized in that its average iron content is 5 times lower than that of the initial molten metal bath obtained at the conclusion of the smelting stage.

Yet another subject of the invention is a manufacturing process for a semi-finished product in which at least one remelt block obtained by the process according to the invention is melted.

Yet another subject of the invention is the use of a semi-finished product obtained by the process according to the invention for the manufacture of an aircraft structural element.

DESCRIPTION OF THE INVENTION

Figure 1:
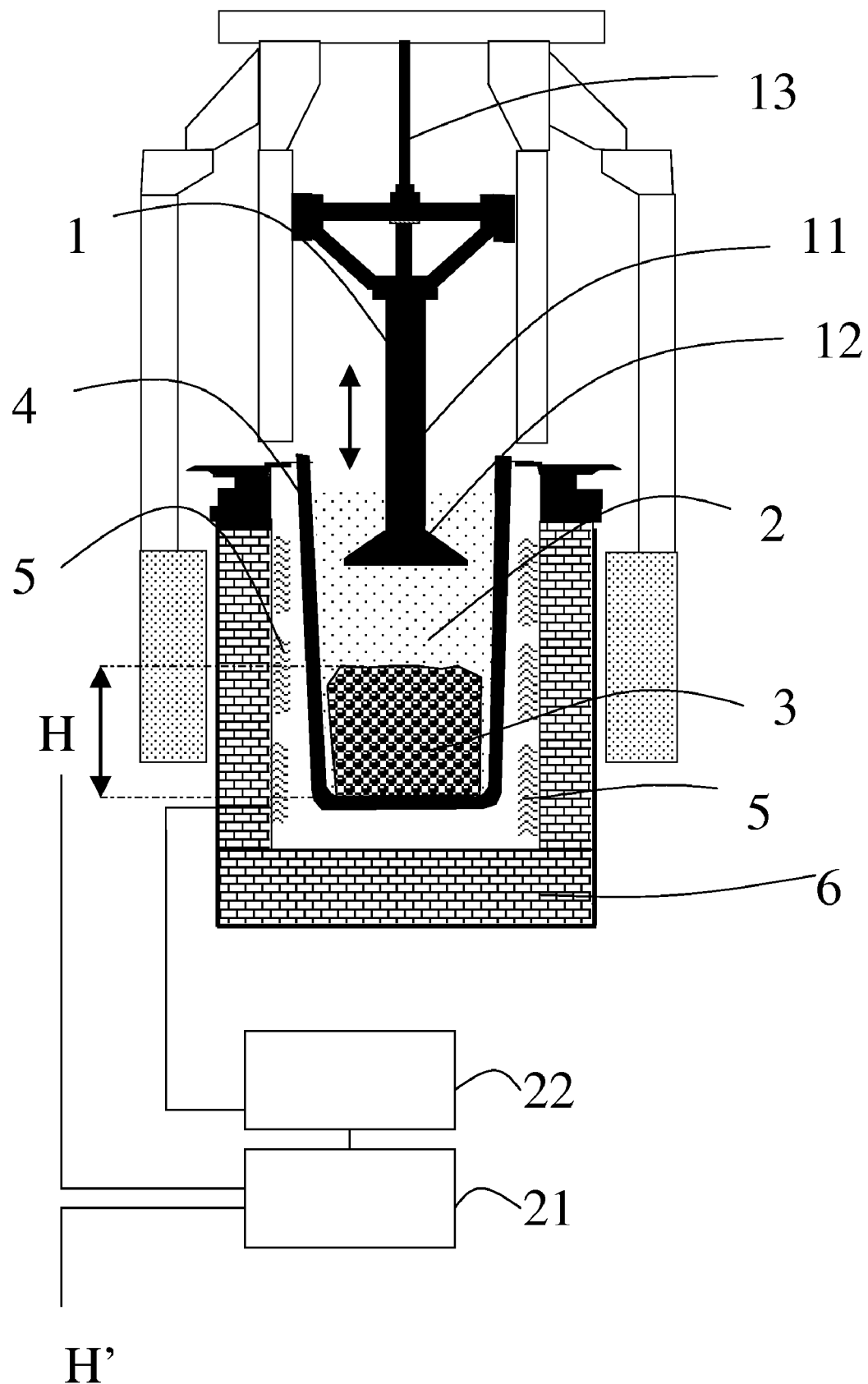
FIG. 1 illustrates a segregation device which can be used in the context of the invention.

Unless otherwise stated, all indications relating to the chemical composition of alloys are expressed as a percentage by weight. The names of alloys follow the rules of The Aluminum Association, known to experts in the field. The chemical composition of standardized aluminum alloys is defined for example in standard EN 573-3 entitled "Aluminium and aluminium alloys. Chemical composition and form of wrought products. Part 3: Chemical composition".

Unless otherwise stated, the definitions of European standard EN 12258-1 entitled "Aluminum and aluminum alloys—Terms and definitions—Part 1: General terms" apply. Terms related to scrap and its recycling are described in standard EN12258-3 entitled "Aluminum and alloys—Terms and definitions—Part 3: Scrap (raw materials for recycling)".

The term "machining" includes any process for removing matter such as turning, milling, drilling, boring, tapping, electroerosion, resurfacing and polishing. Within the context of this invention, the term "semi-finished product" is used to mean a semi-finished product designed to be worked as, in particular, a plate for rolling, an ingot for extruding, a block for forging. Within the context of this invention, the term "remelt block" indicates a semi-finished product intended to be remelted, containing aluminum and for which the sum of the Zn, Cu, Mg and Li contents is at least 3% by weight. Advantageously the sum of the Zn, Cu, Mg and Li contents is at least 4% by weight and in a preferred method at least 5% by weight, in the remelt blocks according to the invention.

The term "structural element" refers to a part used in mechanical engineering for which the mechanical, static and/or dynamic characteristics are of particular importance for the performance and the integrity of the structure, and for which a structural analysis is generally prescribed or carried out. For an aircraft, these structural elements include the parts which make up the fuselage (such as the fuselage skin, stringers, bulkheads, circumferential frames), the wings (such as the wing skin, stringers or stiffeners, ribs and spars) and the tail unit, made up of horizontal and vertical stabilizers, as well as floor beams, seat tracks and doors.

The process according to the invention includes the stages of: supplying the scrap, smelting it, purifying it by segregation, recovering the solidified mass, optionally purifying the peritectic elements and manufacturing the semi-finished products.

The various stages of the process according to the invention can be implemented continuously, semi-continuously or discontinuously (batch). It is possible in certain embodiments to carry out certain stages continuously, such as for example the smelting stage, and other stages discontinuously, such as for example the segregation stage. Advantageously, in the semi-continuous or discontinuous embodiment the various stages quoted in the preceding paragraph are carried out successively.

1/ Supplying Scrap

Scrap suitable for being recycled by the process according the present invention may take various forms.

If scrap is in massive form it is generally used for direct smelting.

In general, scrap is in divided form, such as chips, turnings, off-cuts or clippings and covered with lubricants which may be whole emulsions or oils and which are referred to here by the general term "oils". The amount of oil present on scrap varies according to the manufacturing stage during which it is generated and the technology used for removing the metal. The amount of oil present on the scrap obtained during the scalping operation for rolling plates is generally small, but the amount of oil present on scrap from machining operations is much greater. No matter how much oil is on the scrap, the present invention can be used. A preliminary de-oiling stage may possibly prove to be necessary or at least useful. It can be carried out using any conventional chemical and/or heat cleaning methods. For chemical degreasing using a water-based substance, a drying stage is necessary. An advantageous degreasing method involves using a cylindrical, revolving furnace with burner (IDEX® type); the atmosphere of this type of furnace contains little oxygen, typically less than 5% or even 1%, to prevent the oils from igniting. The oxygen content is managed in this type of furnace using a measurement probe and a control loop.

Compacted scrap may require a crushing stage.

The scrap used in the context of this invention contains mainly aluminum alloys used in the aircraft industry, i.e. it comprises at least 50%, preferably at least 70% and even more preferably at least 90% of aluminum alloys used in the aircraft industry. In the context of this invention, "aluminum alloys used in the aircraft industry" means alloys belonging to series 2XXX, 6XXX and 7XXX. It is preferable that the scrap used in the context of this invention be sorted so that it comprises mainly series 7XXX alloys or series 2XXX alloys, i.e. the scrap comprises at least 50%, preferably at least 70%, and even more preferably at least 90% of alloys from the selected series. Advantageously these alloys are suitably sorted, i.e. scrap from a different series from that of the scrap to be recycled is preferably limited to 5% and, even more advantageously, to 1%. Suitable series 7XXX alloys are in particular alloys 7010, 7040, 7050, 7150, 7250, 7055, 7056, 7068, 7049, 7140, 7149, 7249, 7349, 7449, 7075, 7175 and 7475. For series 2XXX alloys, it is advantageous to separate alloys containing lithium and/or silver from alloys that do not contain any in amounts above impurity level, typically 0.05% by weight.

Suitable series 2XXX alloys that do not contain lithium and/or silver are in particular alloys 2014, 2022, 2023, 2024, 2026, 2027, 2056, 2224, 2324 and 2524. Suitable series 2XXX alloys that do contain lithium and/or silver are in particular alloys 2050, 2090, 2091, 2094, 2095, 2097, 2098, 2099, 2039, 2139, 2195, 2196, 2197, 2199, 2297 and 2397, as defined by Aluminum Association.

The advantage of using sorted waste is to facilitate the use of remelt blocks obtained by the process according to the invention in alloys of the same series. The process according to the invention is also advantageous for recycling scrap containing scandium.

It is preferable that the scrap used in the context of this invention should not be polluted with Fe and Si by waste that is not aluminum alloy. The process according to the invention may include a stage for reducing the amount of ferrous waste.

Ferrous metals can be separated out by magnetic and/or eddy current sorting; this latter method being particularly appropriate for separating magnetic waste (white metals, stainless steel, etc.) and non-magnetic (red metals, copper, brass, etc.). The Fe content of scrap from ferrous alloy parts can in this way be limited. Scrap sorting can be improved still further by using a device based on the differences in particle size, density and/or electrical conductivity as described in U.S. Pat. No. 5,060,871.

In short, the supply stage may include, depending on the initial definition of scrap, the operations of:
  selecting the alloy series (generally 2XXX or 7XXX) which compose the scrap and the appropriate sorting technique,
  separation of any metallic or non-metallic impurities,
  optionally de-oiling.

These operations may possibly be replaced by supplying scrap with well-defined characteristics.

2/ Smelting Scrap

Scrap is smelted in a smelting furnace to give an initial molten metal bath. As the scrap used contains mainly aluminum alloys used in the aircraft industry, the sum of the Zn, Cu, Mg and Li contents in the initial molten metal bath is always greater than 4% by weight. Advantageously the sum of the Zn, Cu, Mg and Li contents is greater than 6% by weight and in a preferred method greater than 8% by weight, in the initial molten metal bath.

In an advantageous embodiment of the invention, the smelter used is a furnace with electromagnetic agitation (an induction furnace), as this type of furnace makes it possible to limit the combustion of scrap. In the case of the smelting of 2XXX series alloys containing lithium and/or silver, it is advantageous to create a floating bed of scrap on the molten metal bath making it possible to protect the molten metal bath from oxidation during the entire smelting stage, or part of it.

3 Purification by Segregation

The main aluminum purification processes known are the electrolysis purification (known as a "three-layer process" or "Gadeau process") and the purification process by fractional crystallization (known as a "segregation" process). These processes are used in the aluminum industry solely to obtain metal of very high purity (typically with an aluminum content greater than 99.9% by weight and as much as 99.999%) from metal that is already relatively pure (typically with an aluminum content greater than 99.5% by weight, or even greater than 99% by weight). So patents EP 0 091 386 and U.S. Pat. No. 6,406,515 (Aluminum Pechiney) or U.S. Pat. No. 4,734,127 (Nipponese Light Metal) describe processes for the segregation of liquid aluminum with a total content of impurities of around 500 to 1500 ppm (or an aluminum content higher than 99.85% by weight) and do not consider applying these processes for starting metals with aluminum contents of less than 99% by weight. The segregation process makes it possible to purify elements with a low partition coefficient. The partition coefficient is the ratio between the balance between the concentration of the element in the solid phase and its concentration in the liquid phase.

The use of this type of process for the recycling of scrap containing impurities requires many engineering and economic problems to be solved because these processes were optimized for the manufacture of products for the electronics industry whose requirements have nothing to do with those of scrap recycling. So the ratio between the cost of the operations and the value of the products is much lower for the manufacture of highly pure metal than for scrap recycling.

In addition, there are several physicochemical differences between pure or relatively pure liquid aluminum, i.e. series 1XXX alloys whose total content of elements other than aluminum is at the most 1%, and charged aluminum alloys whose total content of the elements Cu, Zn, Mg and Li is greater than 4% by weight; these differences have important consequences when using a segregation process.

First, the freezing range, i.e. the variation in temperature between the liquidus and the solidus of charged alloys is much greater than that of pure metal. Next, the temperature of the molten metal changes much more with the degree of purification in the case of a charged alloy than for a pure metal. In addition, in the case of a charged alloy, the residual liquid which takes on impurities during purification may reach the eutectic point at which precipitation of intermetallic particles occurs. These intermetallic particles are likely to mix with the purified crystals, thereby greatly reducing purification. Lastly, the number of elements interacting in a charged alloy makes it difficult or even impossible to make theoretical forecasts as to the outcome of the purification. So the partition coefficient, which is known fairly accurately for binary mixtures, is unknown in the case of a charged alloy such as a 2XXX or 7XXX alloy.

Transposing processes developed for pure metal to the purification of alloy scrap whose total Cu, Zn, Mg and Li content is greater than 4% by weight is therefore a very dubious affair because many physical parameters are very different and the consequences for the thermal control of the process, for example, are great, making theoretical forecasts impossible.

Within the context of the invention, purification by fractional crystallization during a stage known as the segregation phase is carried out in order to obtain a purified solidified mass and a bath of residual liquid rich in impurities. Fractional crystallization processes in which the metal is solidified on a cooled rotor may be used. Patent application JP 11-100620 and U.S. Pat. No. 6,398,845 for example, describe this type of process. Fractional crystallization processes can also be implemented, in which a furnace with a cooled bottom is used, as described for example in patent application JP 58-104132. Advantageously, it is preferable to use fractional crystallization processes in which the crystals formed remelt partially, which tends to improve purification. A process such as is described in U.S. Pat. No. 4,221,590 and U.S. Pat. No. 4,294,612, in which the partial remelting of crystals formed, is obtained by heating the furnace bottom. Patent FR 2 788 283 (Aluminium Pechiney) also describes a process including partial remelting to obtain refined and ultra-refined metal while periodically, and in a controlled way, tamping down crystals formed by fractional crystallization. This patent also describes a device making it possible to use said process. In an advantageous embodiment of the invention the solidified mass undergoes at least partial remelting during the segregation stage to increase the purification coefficient Advantageously, fractional crystallization can be performed using a device making it possible to carry out crystallization at a predetermined speed, crystallization speed being the quantity of crystals formed per unit of time. FIG. 1 illustrates a device which can be used advantageously within the context of the invention for the segregation phase. The device includes a heat-resistant crucible (4), a furnace (6) provided with at least one means of heating (5), at least one means of tamping (1), including a tamping end-piece (12), a stem interdependent of this end-piece (11) and means for moving the stem-end unit (13) vertically. Molten scrap (2) is contained in the heat-resistant crucible (4) and crystallization giving a solidified mass (3) is obtained through a drop in temperature of the molten metal. The device includes a means to measure the height of the solid mass H and means such as a control unit (21) and a power unit (22) to control the means of heating according to the height of the solid mass H measured and the target value H' in order to obtain a predetermined crystallization speed. Advantageously, the means of tamping (1) makes it possible both to tamp down the crystals formed and to measure the height H of the solid mass. Advantageously, the tamping means is alternately immersed and emersed, the time between two successive emersions being between 20 seconds and 10 minutes.

Advantageously, in the discontinuous embodiment in which all the metal is initially charged then subjected to fractional crystallization, the crystallization speed given as the mass of crystals formed, expressed as a percentage of the weight initially charged, per hour of crystallization, is between about 3.8%/h and about 6.2%/h, and preferably ranging between 4%/h and 6%/h. In an advantageous embodiment in which the weight initially charged is typically about 2300 kg, the crystallization speed is preferably between about 90 kg/h (kilograms per hour) and about 140 kg/h and in a preferred method between about 100 kg/h and about 130 kg/h.

If the crystallization speed is too high, purification is poor and a solid mass is obtained with a composition close to that of molten scrap. In this case, the partial remelting of the crystals formed during the operation, which is a very favorable factor for the purification, is too limited. If the crystallization speed is too low, intermetallic particles may become incorporated into the solidified mass and reduce its purity. In addition, if the crystallization speed is too low, the operation is likely to lose its economic worth.

The "yield" of the segregation stage is the relationship between the mass of the remelt block obtained and the initial mass of scrap melted. This yield can be expressed as a percentage. If the yield is too low, the segregation stage is of no economic value. If the yield is too high, the residual liquid at the end of the stage is highly charged with alloy elements that can cause the formation of intermetallic particles detrimental to the purity of the solidified mass and also make this impure residual liquid difficult to develop economically. Advantageously, the yield of the segregation stage is between about 50% and about 90% and preferably between about 60% and about 80%.

In another embodiment of the invention, fractional crystallization is carried out using a device including a heat-resistant crucible (4), a furnace (6) provided with at least one means of heating (5), at least one means of tamping (1), including a tamping end-piece (12), a stem interdependent of this end-piece (11) and a means for moving the stem/end-piece unit (13) vertically, a means of measurement for continuously measuring the temperature of the molten metal and a control loop to control the means of heating as a function of the temperature of the molten metal. In this embodiment, a predetermined reduction curve is imposed on the temperature of the molten metal. Advantageously, the reduction in the temperature of the molten metal is between 1 and 5° C./h and preferably between 2 and 4° C./h.

In an advantageous embodiment of the invention, the segregation stage is stopped according to the temperature of the molten metal. Advantageously, the segregation stage is stopped when the temperature of the molten metal reaches 570° C. and preferably when it reaches 580° C.

4 Recovery of the Solidified Mass

After the segregation stage, the residual liquid is separated from the solidified mass. Advantageously, this separation is carried out by draining, by tipping the heat-resistant crucible in which the segregation stage was carried out. The tipping angle is chosen in order to quickly drain the liquid without running the risk of allowing the solidified mass to drop. In another embodiment of the invention, the residual liquid is sucked up using appropriate means.

The solidified mass is recovered using appropriate means. If the solidified mass is in a heat-resistant crucible, the surface of the mass can advantageously be broken in order to introduce a means of lifting making it possible to extract the solidified mass from the heat-resistant crucible. The solidified mass obtained can be used as a remelt block either as it is, or machined on its surface and/or sawn to be used as a remelt block. The remelt block according to the invention is characterized in that its average iron content is 5 times lower and preferably 10 times lower than that of the initial molten metal bath obtained at the conclusion of the smelting stage. Preferably, the iron content and silicon content of the remelt block according to the invention are less than 0.1% by weight and preferably lower than 0.05% by weight.

Advantageously, the weight of the remelt blocks according to the invention is at least 1000 kg and preferably at least 1300 kg.

5 Optional Purification of the Peritectic Elements

It may be advantageous to carry out an additional stage which involves purifying the peritectic elements, i.e. the elements whose partition coefficient is greater than 1, and in particular chromium and zirconium. Advantageously, this stage is carried out by precipitating at least one peritectic element using a selective precipitating agent including boron, and separating the precipitation products formed.

This stage is advantageously placed between the smelting and segregation stages to give the following technical advantages:
  the segregation processes do not allow the peritectic elements to be purified; quite the reverse, since these, by definition, are present in the first crystals formed. It is therefore advantageous to purify them before the segregation stage which, in contrast, would lead to a certain enrichment of these elements.
  the segregation process according to the invention makes it possible to obtain solidified metal directly, and a second smelting stage would be necessary to carry out the purification stage of the peritectic elements if this were placed after segregation.

If waste sorting has made it possible to avoid mixing alloys containing various peritectic elements, this stage may not be necessary.

6 Manufacture of Semi-Finished Products.

The remelt blocks obtained by the process according to the invention can be used for the manufacture of semi-finished products designed for the aircraft industry. The remelt blocks according to the invention are advantageous because they provide alloy elements such as Zn Cu, Mg and Li without bringing in impurities such as Fe and Si, which would not be possible by adding scrap containing mainly aluminum alloys used in the aircraft industry directly.

In one embodiment of the invention, at least one remelt block according to the invention is melted, possibly with of other types of aluminum ingots, an alloy designed for the aircraft industry is made, typically an alloy of series 7XXX or series 2XXX, and this alloy is cast in the shape of a semi-finished product. The semi-finished product obtained can be used to manufacture a structural element of an aircraft.

Example

In the various tests carried out, the following stages are involved:
  scrap alloy 7075 is collected
  a sufficient quantity of scrap is melted to feed a segregation device
  fractional crystallization, with a predetermined speed of crystal formation, is performed
  the residual impure liquid is drained off The tests were carried out in furnaces designed for fractional crystallization similar to those described in patent FR2788283, provided with a device for controlling the crystallization speed. FIG. 1 illustrates the device used for the tests. The means of tamping makes it possible to measure the height H of crystals formed. A control loop acting on the heating power level is used to program the crystallization speed to a predetermined value.

The tests carried out are described in table 1.

purification of the elements Cu, Mg and Zn for these tests is to be observed, which therefore represent a particularly favorable compromise.

TABLE 1 parameters of the tests carried out.

| Test | Crucible diameter (mm) | Crucible height (mm) | Bloom weight targeted(kg) | Crystallization time (h) | Programmed crystallization speed (kg/h) | Programmed solidified fraction (%) | Programmed crystallization speed (%/h) |
|---|---|---|---|---|---|---|---|
| 1 | 800 | 2050 | 1550 | 20 | 78 | 74% | 3.7 |
| 2 | 800 | 2050 | 1550 | 20 | 78 | 74% | 3.7 |
| 3 | 800 | 2050 | 1350 | 12 | 113 | 64% | 5.4 |
| 4 | 800 | 2050 | 1350 | 11 | 123 | 64% | 5.8 |
| 5 | 860 | 2050 | 1700 | 12 | 142 | 74% | 6.2 |
| 6 | 860 | 2050 | 1800 | 12 | 150 | 78% | 6.5 |

An analysis of the starting metal is made once smelting is complete. For test no 3, this analysis was not carried out: the batches of scrap being the same for all the tests, the initial composition is most probably of the same order of magnitude for test no 3 as for the other tests. Technical difficulties were encountered for the silicon analysis. The results are given as a guide, but the accuracy obtained is poor.

Figure 2:
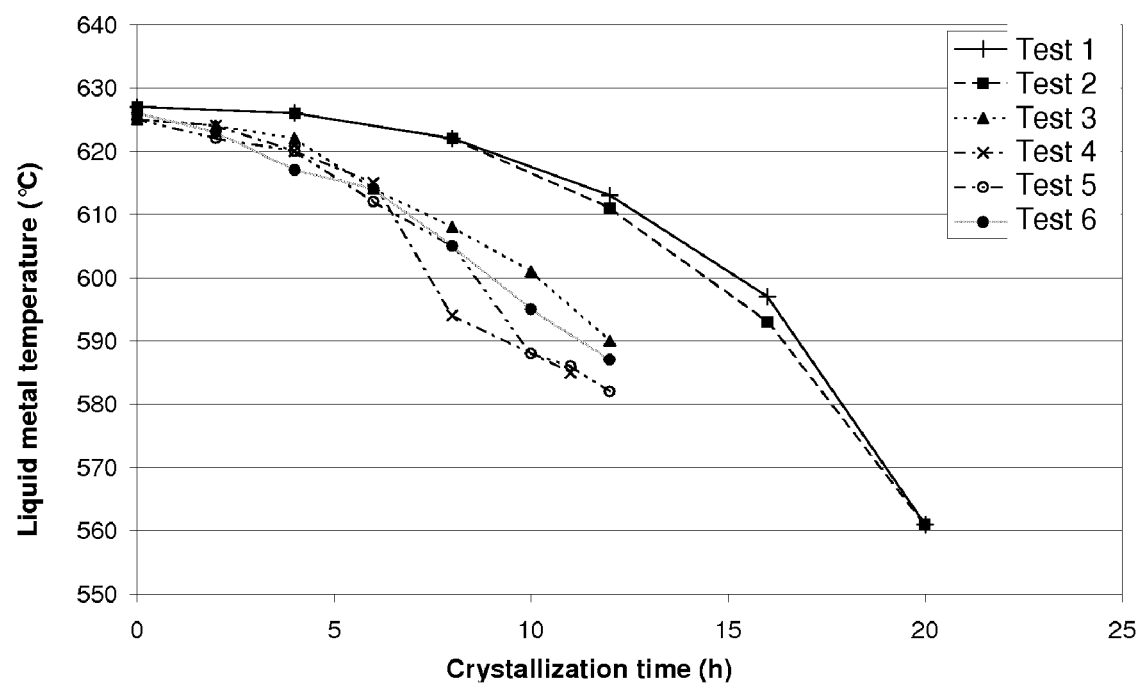
FIG. 2 illustrates the change in temperature of the molten metal according to the crystallization time for the various tests carried out.

The temperature of the molten metal was measured every two hours using a thermocouple. FIG. 2 shows how temperature changes with crystallization speed. The residual molten metal was analyzed at the end of the operation.

The residual molten metal was drained at the end of the test by tipping the crucible. This final operation could not be performed for test 4.

Solidified metal was finally extracted from the crucible and weighed.

Determining the material balance to give an accurate reading of the purification coefficient obtained for each operation proves to be difficult because of inaccuracies involving the weights and the analyses. A purification indicator $X_i$ is calculated for each element i as follows:

$$X_i = \frac{[i]_0}{[i]_f} * \frac{1}{fs}$$

where
$[i]_0$ the initial concentration of element i in the molten metal
$[i]_f$ the final concentration of element i in the molten metal
$f_s$ is the programmed solidified fraction.

Table 2 gives the results obtained for the various tests.

The poorer performance obtained for tests 1 and 2 might be related to the intermetallic crystal precipitation of type $Al_3Fe$. The temperature reached by the molten metal at the end of these tests (see FIG. 2) is close to the temperature estimated using models for the start of precipitation).

The poorer performance obtained for tests 5 and 6 might be related to the absence in this case of partial remelting of the solidified mass in the course of the operation The partial remelting of the solidified mass in the course of the operation gives additional purification. In certain cases, the performances obtained in test conditions 1, 2, 5 or 6 may prove to be sufficient, in particular for mixtures of scrap only slightly enriched in iron and silicon which do not require thorough purification.

The invention claimed is:

1. A manufacturing process for a remelt block containing aluminum designed for making aluminum alloy for the aircraft industry in which
    (i) scrap containing mainly aluminum alloys used in the aircraft industry is supplied during a supply stage;
    (ii) said scrap is melted in a smelting furnace in order to obtain an initial molten metal bath during a smelting stage;
    (iii) the initial molten metal bath is subjected to purification by fractional crystallization in order to obtain a solidified mass and a bath of residual liquid during a segregation stage; and
    (iv) the solidified mass is recovered in order to obtain a remelt block during a recovery stage;
    wherein a floating bed of scrap is created on the molten metal bath during whole or part of the smelting stage.

TABLE 2

Results obtained

| Test | Weight measured | $[Fe]_0$ | $[Fe]_f$ | $X_{Fe}$ | $[Si]_0$ | $[Si]_f$ | $X_{Si}$ | $[Cu]_0$ | $[Cu]_f$ | $X_{Cu}$ | $[Zn]_0$ | $[Zn]_f$ | $X_{Zn}$ | $[Mg]_0$ | $[Mg]_f$ | $X_{Mg}$ | $[Cr]_0$ | $[Cu]_f$ | $X_{Cr}$ |
|---|---|---|---|---|---|---|---|---|---|---|---|---|---|---|---|---|---|---|---|
| 1 | 1550 | 0.14 | 0.46 | 4.4 | 0.10 | 0.37 | 5.0 | 1.6 | 4.5 | 3.8 | 5.9 | 11.5 | 2.6 | 2.6 | 4.8 | 2.5 | nd | nd | nd |
| 2 | 1500 | 0.16 | 0.55 | 4.6 | 0.12 | 0.37 | 4.1 | 1.4 | 4.3 | 4.0 | 5.7 | 11.5 | 2.7 | 2.5 | 4.9 | 2.6 | nd | nd | nd |
| 3 | 1400 | nd | 0.54 | nd | nd | 0.41 | nd | nd | 4.1 | nd | nd | 10.8 | nd | nd | 4.3 | nd | nd | nd | nd |
| 4 | nd | 0.15 | 0.60 | 6.2 | nd | 0.44 | nd | 1.7 | 4.8 | 4.3 | 6.2 | 11.7 | 2.9 | 2.7 | 4.5 | 2.5 | 0.18 | 0.06 | 0.5 |
| 5 | 1700 | 0.09 | 0.26 | 3.9 | 0.06 | 0.37 | 8.3 | 2.0 | 4.56 | 3.1 | 6.0 | 10.5 | 2.4 | 1.8 | 4.9 | 3.7 | 0.10 | 0.02 | 0.3 |
| 6 | 1900 | 0.14 | 0.38 | 3.5 | 0.09 | 0.24 | 3.4 | 1.7 | 3.86 | 2.9 | 6.2 | 10.4 | 2.1 | 2.5 | 4.2 | 2.2 | 0.18 | 0.09 | 0.6 |

(nd: not determined)

Figure 3:
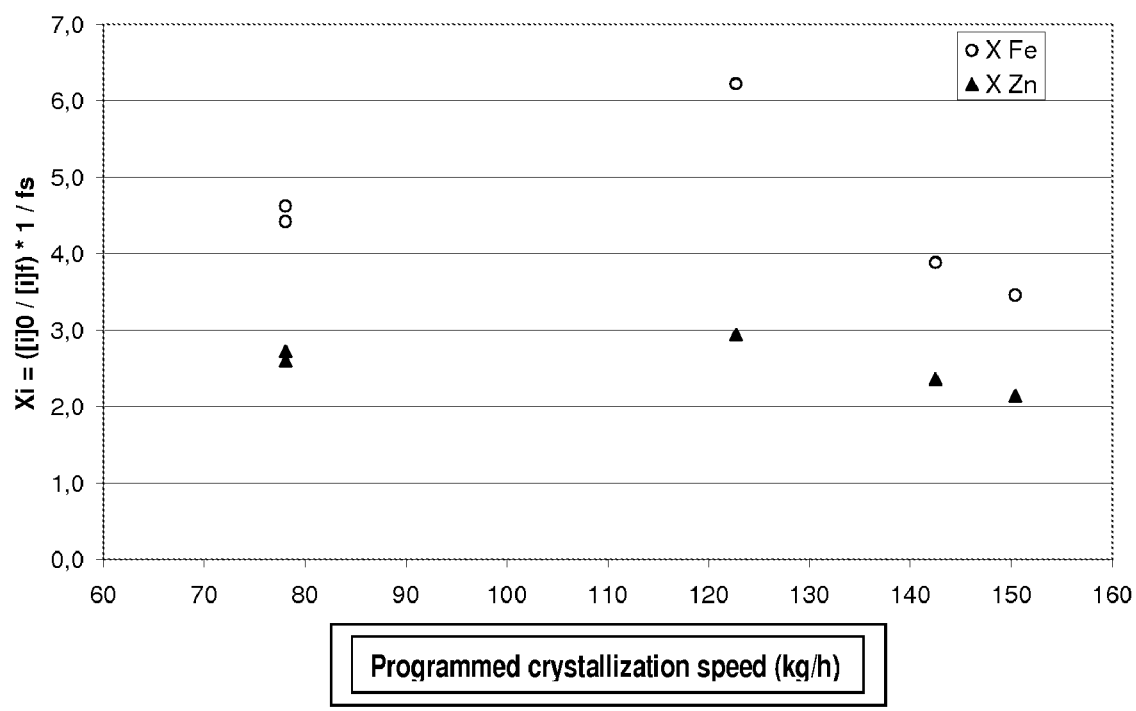
FIG. 3 illustrates the change in purification rate as a function of the speed of crystallization programmed.

The weights of solidified metal obtained agree satisfactorily with the weights targeted. FIG. 3 illustrates the results obtained. The best results in terms of purification of iron are obtained for tests 3 and 4. No significant increase in the 2. A process according to claim 1 in which said scrap comprises mainly alloys of series 7XXX or series 2XXX.

3. A process according to claim 2 in which said scrap includes alloys 7XXX selected from the group consisting of 7010, 7040, 7050, 7150, 7250, 7055, 7056, 7068, 7049, 7140, 7149, 7249, 7349, 7449, 7075, 7175 and 7475.

4. A process according to claim 1 in which the supply stage includes a magnetic or eddy current sorting operation.

5. A process according to claim 1 in which the supply stage includes a de-oiling operation.

6. A process according to claim 1 in which an additional purification stage for peritectic elements is performed.

7. A process according to claim 6 in which the peritectic purification stage of the elements is carried out between the smelting and segregation stages.

8. A process according to claim 1 in which said solidified mass undergoes at least one partial remelting during the segregation stage.

9. A process according to claim 1 in which said fractional crystallization is carried out using a device making it possible to perform crystallization at a predetermined speed.

10. A process according to claim 9 in which the segregation stage is performed using a device including a heat-resistant crucible, a furnace provided with at least one means of heating, at least one means of tamping, including a tamping end-piece, a stem interdependent of this end-piece and means to move the stem/end-piece unit vertically, said device also including a means for measuring the height of solid mass H and means for controlling the operation of the means of heating as a function of H and target value H'.

11. A process according to claim 10 in which the means of tamping is alternatively immersed and emersed.

12. A process according to claim 1 in which the relationship between the mass of the remelt block obtained and the initial molten scrap mass is between about 50% and about 90%.

13. A process according to claim 1 in which draining is carried out during the recovery stage.

14. A process according to claim 1 in which the sum of the Zn, Cu, Mg and Li contents of said remelt block is at least 3% by weight.

15. A process according to claim 1 in which said remelt block has a weight of at least 1000 kg.

16. A manufacturing process for a semi-finished product comprising obtaining a remelt block, by the process according to claim 1, and smelting the block; wherein an alloy for the aircraft industry is produced; and further comprising casting the alloy in the shape of a semi-finished product.

17. A manufacturing process according to claim 16, wherein an alloy of series 7XXX or series 2XXX is produced.

18. A manufacturing process for a remelt block containing aluminum designed for making aluminum alloy for the aircraft industry in which
  (i) scrap containing mainly aluminum alloys used in the aircraft industry is supplied during a supply stage;
  (ii) said scrap is melted in a smelting furnace in order to obtain an initial molten metal bath during a smelting stage;
  (iii) the initial molten metal bath is subjected to purification by fractional crystallization in order to obtain a solidified mass and a bath of residual liquid during a segregation stage;
  (iv) the solidified mass is recovered in order to obtain a remelt block during a recovery stage;
  wherein all the metal is initially charged and then subjected to fractional crystallization; and wherein the fractional crystallization is carried out at a speed, given as the mass of formed crystals, expressed as a percentage of the weight initially charged, per hour of crystallization, of between about 3.8%/h and about 6.2%/h.

19. A manufacturing process for a remelt block containing aluminum designed for making aluminum alloy for the aircraft industry in which
  (i) scrap containing mainly aluminum alloys used in the aircraft industry is supplied during a supply stage;
  (ii) said scrap is melted in a smelting furnace in order to obtain an initial molten metal bath during a smelting stage;
  (iii) the initial molten metal bath is subjected to purification by fractional crystallization in order to obtain a solidified mass and a bath of residual liquid during a segregation stage;
  (iv) the solidified mass is recovered in order to obtain a remelt block during a recovery stage;
  wherein the fractional crystallization step is carried out at a speed of between about 90 kg/h and about 140 kg/h.

20. A manufacturing process for a remelt block containing aluminum designed for making aluminum alloy for the aircraft industry in which
  (i) scrap containing mainly aluminum alloys used in the aircraft industry is supplied during a supply stage;
  (ii) said scrap is melted in a smelting furnace in order to obtain an initial molten metal bath during a smelting stage;
  (iii) the initial molten metal bath is subjected to purification by fractional crystallization in order to obtain a solidified mass and a bath of residual liquid during a segregation stage;
  (iv) the solidified mass is recovered in order to obtain a remelt block during a recovery stage;
  wherein the segregation stage is carried out using a device including a heat-resistant crucible, a furnace provided with at least one means of heating, at least one means of tamping, including a tamping end-piece, a stem interdependent of this end-piece and a means for moving the stem/end-piece unit vertically, a means of measurement for continuously measuring the temperature of the molten metal and a control loop to control the means of heating as a function of the temperature of the molten metal and in which a predetermined speed of reduction in the temperature of the molten metal is imposed.

21. A process according to claim 20 in which said predetermined speed of reduction in the temperature of the molten metal is between 1 and 5° C./h.

22. A manufacturing process for a remelt block containing aluminum designed for making aluminum alloy for the aircraft industry in which
  (i) scrap containing mainly aluminum alloys used in the aircraft industry is supplied during a supply stage;
  (ii) said scrap is melted in a smelting furnace in order to obtain an initial molten metal bath during a smelting stage;
  (iii) the initial molten metal bath is subjected to purification by fractional crystallization in order to obtain a solidified mass and a bath of residual liquid during a segregation stage;
  (iv) the solidified mass is recovered in order to obtain a remelt block during a recovery stage;
  wherein the segregation stage is stopped when the temperature of the molten metal reaches 570° C.

* * * * *